United States Patent [19]
Murakoshi et al.

[11] Patent Number: 6,122,248
[45] Date of Patent: Sep. 19, 2000

[54] DATA TRANSMISSION SYSTEM WITH BUS FAILURE RECOVERY

[75] Inventors: Sho Murakoshi, Tsurugashima; Hiroaki Shibuki, Tokyo; Hidemi Usuba, Tsurugashima; Makoto Matsumaru, Tsurugashima; Kunihiro Minoshima, Tsurugashima; Kinya Ohno, Tsurugashima; Seiichi Hasebe, Tokorozawa, all of Japan

[73] Assignee: Pioneer Electronic Corporation, Tokyo, Japan

[21] Appl. No.: 09/349,918

[22] Filed: Jul. 8, 1999

[30] Foreign Application Priority Data

Jul. 9, 1998 [JP] Japan .................................. 10-193879

[51] Int. Cl.[7] ...................................................... G01R 31/08

[52] U.S. Cl. ........................... 370/216; 370/222; 370/242

[58] Field of Search ................................... 370/216, 222, 370/242

[56] References Cited

U.S. PATENT DOCUMENTS 5,706,278   1/1998   Robillard et al. ........................ 370/222
5,954,796   9/1999   McCarty et al. ........................ 370/242

*Primary Examiner*—Trong Phan
*Attorney, Agent, or Firm*—Morgan, Lewis & Bockius LLP

[57] ABSTRACT

A data transmission system capable of ensuring proper operation even when any nodes-to-bus connection, which is not allowed by restrictions, is made. The system implements data transmission among a plurality of nodes mutually connected by a cable serving as a bus. The system includes a first process for initializing a control process on the nodes to the bus in accordance with a change in an electrical connection of the bus, a second process of detecting a connection topology of the nodes, and a third process for identifying each node to be connected to the bus. A forbidden connection detecting process is provided for detecting if there is a loop connection path of the nodes on the bus and handling operations are provided for executing handling in accordance with a result of detection by the forbidden connection detecting process.

21 Claims, 8 Drawing Sheets

DATA TRANSMISSION SYSTEM WITH BUS FAILURE RECOVERY

BACKGROUND OF THE INVENTION

1. Field of the Invention

The present invention relates to a data transmission system, and, more particularly, to a data transmission system which implements transmission and reception of data signals from and to electronic devices (nodes) including an information device.

2. Description of the Related Art

A fast serial data transfer interface based on the IEEE (Institute of Electrical and Electronics Engineers) 1394-1995 standards is recently receiving attention as an interface capable of transmitting data signals among a plurality of electronic devices. The IEEE 1394-1995 standards specify a plurality of information devices or nodes which are mutually connected by a serial bus and implementation of data transmission among plural systems of nodes in a time-shared manner. The standards provide a technology which facilitates realization of so-called home multimedia systems and home networks.

The IEEE 1394-1995 standards however impose the following restrictions.

(1) The maximum number of nodes connected in the system is 63.
(2) A loop connection path is prohibited within the system.
(3) The connectable upper hop count in the system is limited to 16 (the maximum number of nodes to be connected between one terminal node of the connection path and the other terminal node thereof is 17 including the two terminal nodes).

If a user connects 64 or more nodes to the bus, or employs a loop connection or connects 17 or more hops without considering such restrictions, the proper operation otherwise guaranteed by the IEEE 1394-1995 standards may not be expected. In such a case, bus stopping (hang-up) or malfunction of the bus may occur in the process of controlling nodes to the bus.

The IEEE 1394-1995 standards are adaptable to video cameras and audio products of non-professional or ordinary use and are applicable to a wide range of users. It is thus an urgent task to resolve the aforementioned shortcoming.

SUMMARY OF THE INVENTION

Accordingly, it is an object of the present invention to provide a data transmission system capable of ensuring proper operation even when nodes-to-bus connections, not otherwise allowed by the aforementioned restrictions, are made.

To achieve the object, according to one aspect of the present invention, there is provided a data transmission system for implementing data transmission among a plurality of nodes connected mutually by a cable serving as a bus, which comprises means for performing a first process for initializing a control process on the nodes to the bus in accordance with a change in an electrical connection of the bus, a second process of detecting a connection topology of the nodes, and a third process for identifying each node to be connected to the bus; forbidden connection detecting means for detecting if there is a loop connection path of the nodes on the bus; and handling means for executing handling in accordance with a result of detection by the forbidden connection detecting means.

The forbidden connection detecting means may be designed to measure an elapsed time period since activation of the second process, and to detect that there is a loop connection path of the nodes on the bus when the measured time exceeds a predetermined time.

To achieve the above object, according to another aspect of the present invention, there is provided a data transmission system for implementing data transmission among a plurality of nodes connected mutually by a cable serving as a bus, which comprises means for performing a first process for initializing a control process on the nodes to the bus in accordance with a change in an electrical connection of the bus, a second process of detecting a connection topology of the nodes, and a third process for identifying each node to be connected to the bus; forbidden connection detecting means for detecting if the number of nodes which are connected to the bus exceeds specific number; and handling means for executing handling in accordance with a result of detection by the forbidden connection detecting means.

The forbidden connection detecting means in the second aspect may be designed to detect that the number of nodes which are identified to be connected to said bus in said third process exceeds said specific number To achieve the above object, according to a further aspect of the present invention, there is provided a data transmission system for implementing data transmission among a plurality of nodes connected mutually by a cable serving as a bus, which comprises means for performing a first process for initializing a control process on the nodes to the bus in accordance with a change in an electrical connection of the bus, a second process of detecting a connection topology of the nodes, and a third process for identifying each node to be connected to the bus; forbidden connection detecting means for detecting if connection paths on the bus contain any connection path which has a number of connected nodes, including one terminal node and the other terminal node, which exceeds a specific number; and handling means for executing handling in accordance with a result of detection by the forbidden connection detecting means.

The forbidden connection detecting means in the third aspect may be designed to detect that connection paths on the bus contain any connection path having a number of connected nodes, including one terminal node and the other terminal node, which exceeds a specific number, by analyzing connection topology information of those nodes associated with node identification information acquired after completion of the third process.

In any of the above aspects, the handling means may be designed to include notification means for notifying establishment of an abnormal bus connection in accordance with a result of detection by the forbidden connection detecting means.

In this modification, the notification means may notify the establishment of an abnormal bus connection in a mode corresponding to the result of detection by the forbidden connection detecting means.

In any of the above-mentioned aspects, the handling means may be designed to include connection topology changing means for cutting a bus connection of some of the nodes in accordance with a result of detection by the forbidden connection detecting means.

In this modification, the first process may be activated after a process by the connection topology changing means has been completed.

In any of the aforementioned aspects, the system may conform to the IEEE 1394-1995 standards.

DETAILED DESCRIPTION OF THE PREFERRED EMBODIMENT

A preferred embodiment of the present invention will now be described referring to the accompanying drawings.

Figure 1:
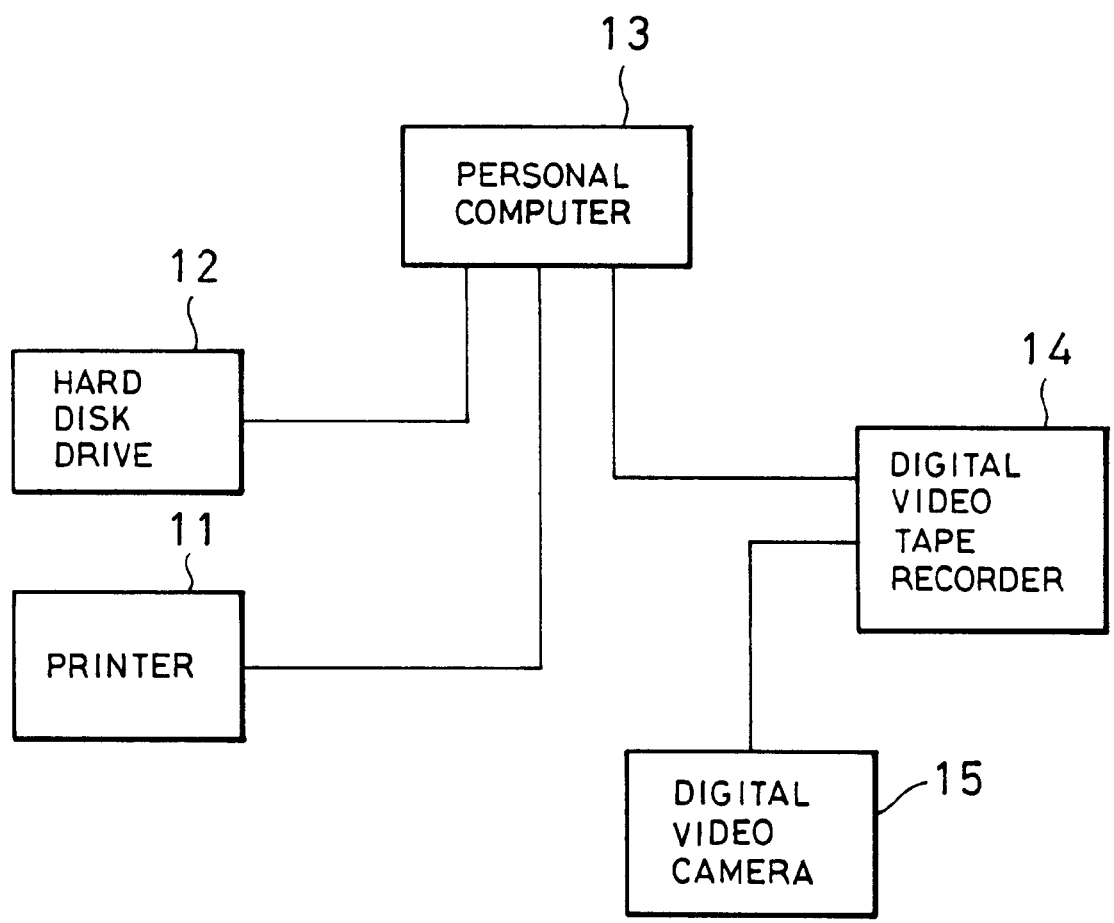
FIG. 1 is a block diagram showing the general configuration of a data transmission system to which one embodiment of the present invention is adapted.

FIG. 1 illustrates the general configuration of a data transmission system to which one embodiment of the present invention is adapted.

In FIG. 1, the data transmission system has a fast serial data transfer interface based on the IEEE 1394-1995 standards, and is constructed by detachably connecting a plurality of electronic devices, such as information devices 11–15 as nodes which handle digital signals, by daisy chain or a multipoint system using cables and connectors.

Those information devices 11–15 may include devices capable of receiving and/or outputting digital data, such as a digital video tape recorder, a digital video disk player, a personal computer, a digital video camera, a hard disk drive, a scanner and a printer. That is, so-called domestic electrical appliances which receive and/or output digital data, may be used as electronic and electrical devices adaptable to this system in addition to a personal computer 13 shown in FIG. 1 and peripheral devices to be connected to the computer 13.

While each of the information devices 11–15 may have a single connector jack if it is used at the terminal end of daisy chain, the devices 11–15 should have two connector jacks to permit the daisy-chaining system, or should have three connector jacks to permit the multipoint system. Each cable has a connector plug provided at either end for connection to the associated connector jack. A path which is established by such connection with a cable serves as a for data transfer.

The fundamental operational flow of the data transmission system will now be described.

Figure 2:
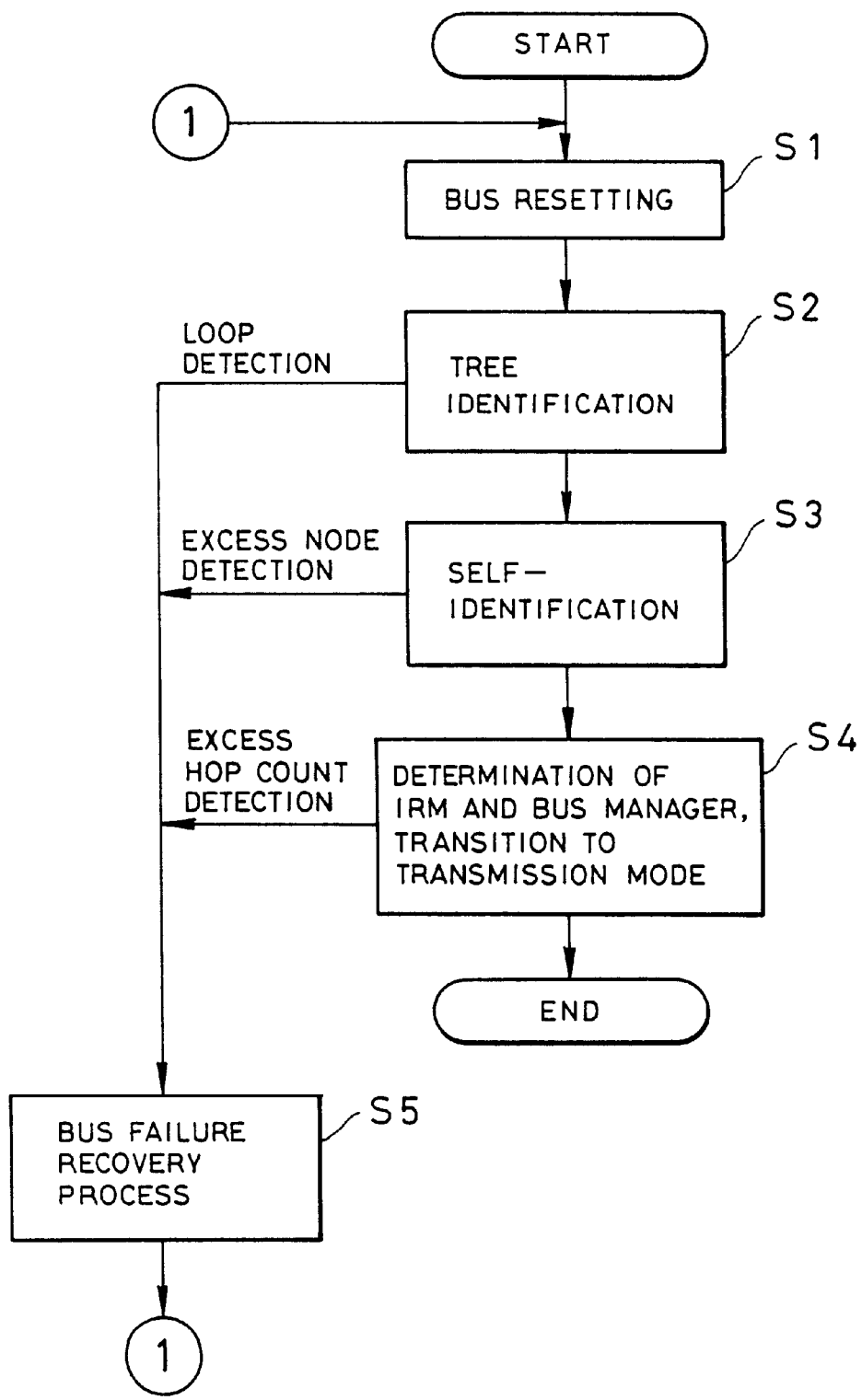
FIG. 2 is a flowchart illustrating the fundamental operation of the data transmission system according to the embodiment of the present invention.

FIG. 2 illustrates the fundamental operational flow that is based on a data transfer protocol specified in the IEEE 1394-1995 standards.

First, bus resetting is carried out as initialization for the data transmission system (step S1).

This bus resetting is accomplished as a node, which detects that a plurality of nodes connected to a bus are powered on, that an additional node is connected to the bus, or that some node is disconnected from the bus, generates a bus reset signal and transmits a bus reset command to the other nodes via the bus, when any of such events occurs. When bus resetting is instructed, each node initializes various associated internal interface controllers. The process in step S1 is equivalent to a first process for initializing a control process on the nodes to a bus in response to a change in an electrical connection form of the bus. It is to be noted that connection and disconnection of a bus may be accomplished by electrical means.

After bus resetting, a tree identification process as a second process is executed (step S2).

This tree identification process generally determines a root node which conforms to the IEEE 1394-1995 standards and acquires a network topology of a tree structure. The identification process in this embodiment also detects whether or not the aforementioned restriction (2) is met, i.e., whether or not a loop connection path is made in the system (loop detection). The details of the determination of the root node, acquisition of network topology information and loop detection will become apparent from the following description.

After tree identification, a self-identification process as a third process is performed (step S3).

This self-identification process affixes ID (Identification) data to each node which conforms to the IEEE 1394-1995 standards, and checks the presence of each node. In addition, the self-identification process in this embodiment detects if the aforementioned restriction (1) is not satisfied, or detects if the number of nodes connected in the system exceeds the maximum number of nodes, i.e., 63. The details of the process in step S3 will also become apparent from the following description.

After self-identification, determination of IRM (Isochronous Resource Manager) and a bus manager, and transition to the ordinary data transmission mode are executed (step S4).

In this step, a process of determining some of the nodes as the IRM and the bus manager is performed in conformity to the IEEE 1394-1995 standards, and a topology map is prepared by gathering ID data affixed to each node in step S3. The topology map is, then, analyzed to detect if the aforementioned restriction (3) is not met or if the hop count exceeds the connectable maximum hop count, i.e., 16" in this system. In other words, whether or not the number of nodes to be connected between one terminal node of a connection path and the other terminal node thereof including those two terminal nodes is greater than "17" (excess hop count detection).

When step S4 ends, the mode goes to the ordinary data transmission mode.

The tree identification process in step S2 will be specifically discussed below.

Figure 3:
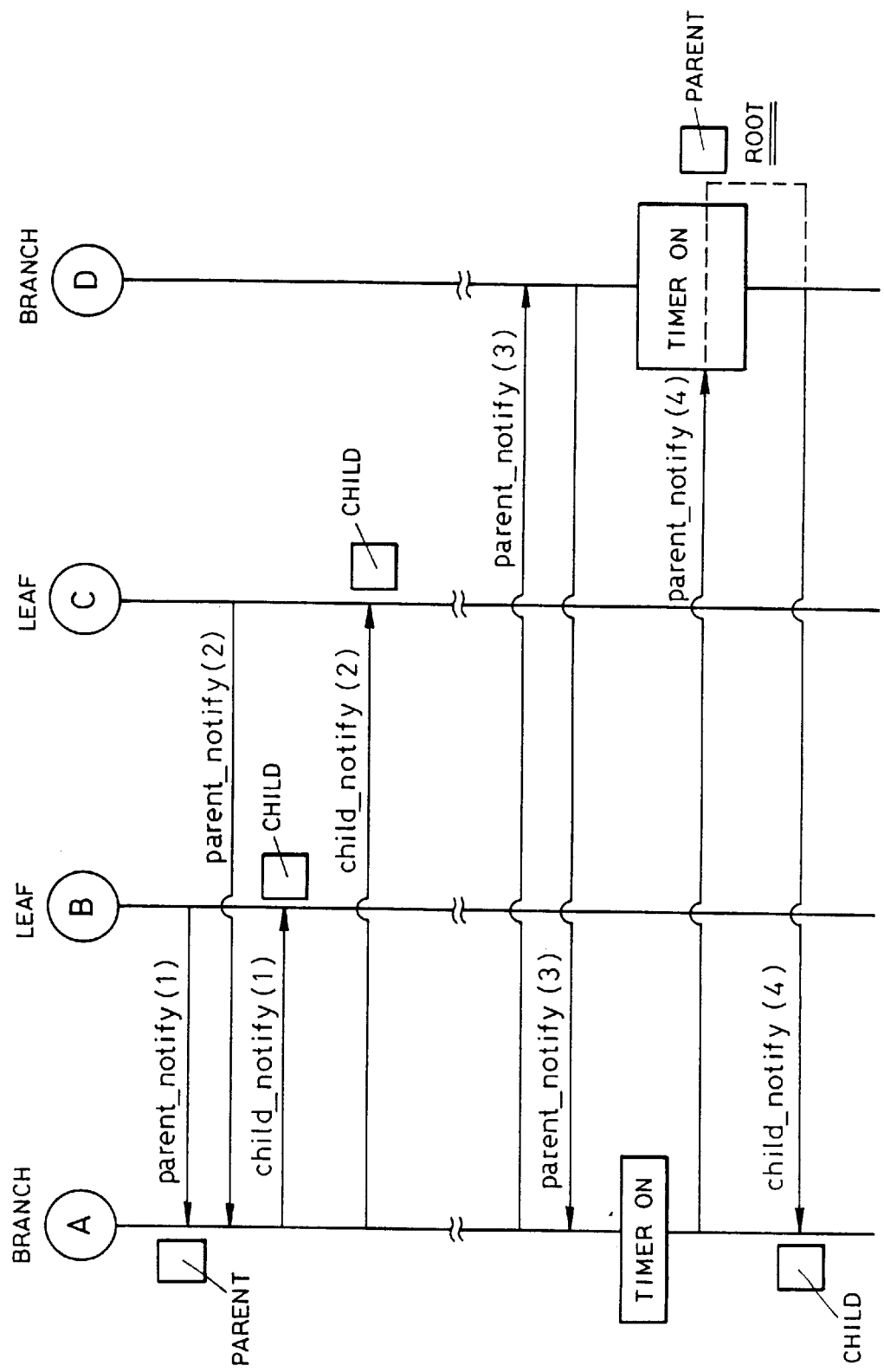
FIG. 3 is a time chart illustrating an example of a tree identification process.
Figure 4:
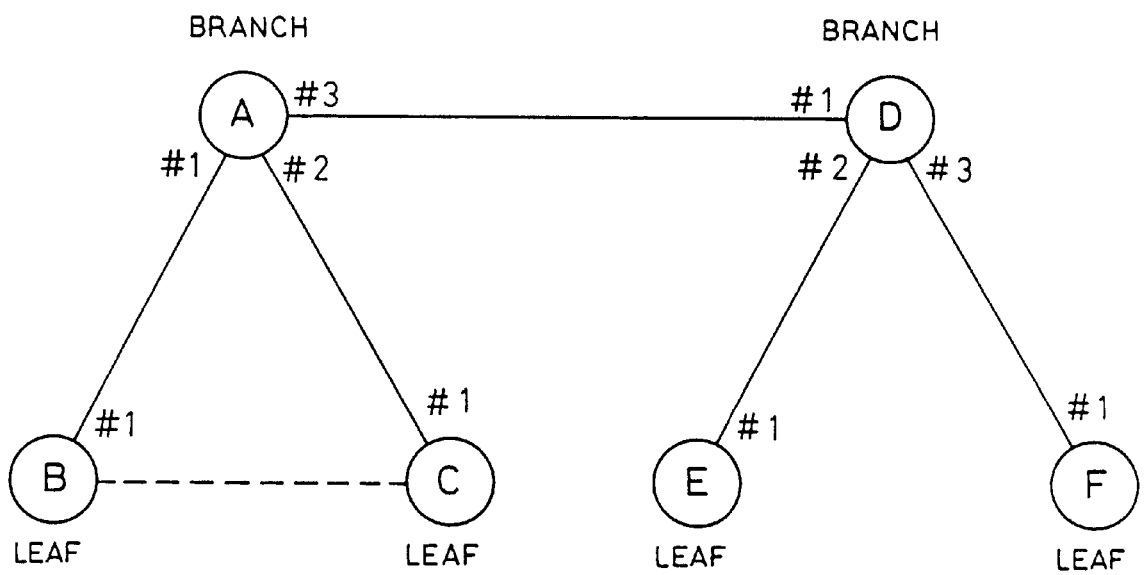
FIG. 4 is an exemplary diagram depicting a first transition state of the data transmission system in the tree identification process.
Figure 5:
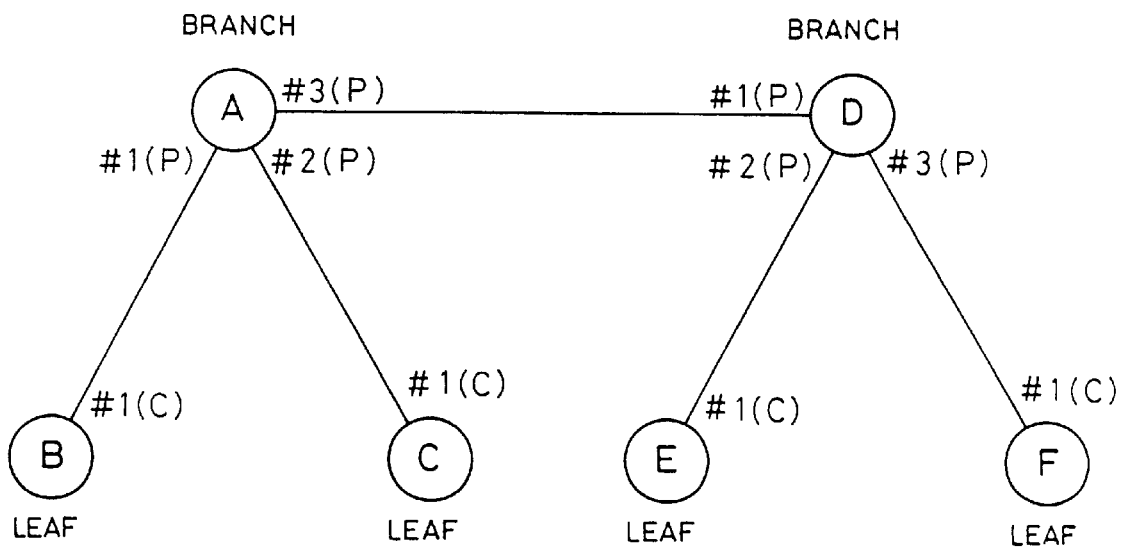
FIG. 5 is an exemplary diagram showing a second transition state of the data transmission system in the tree identification process.
Figure 6:
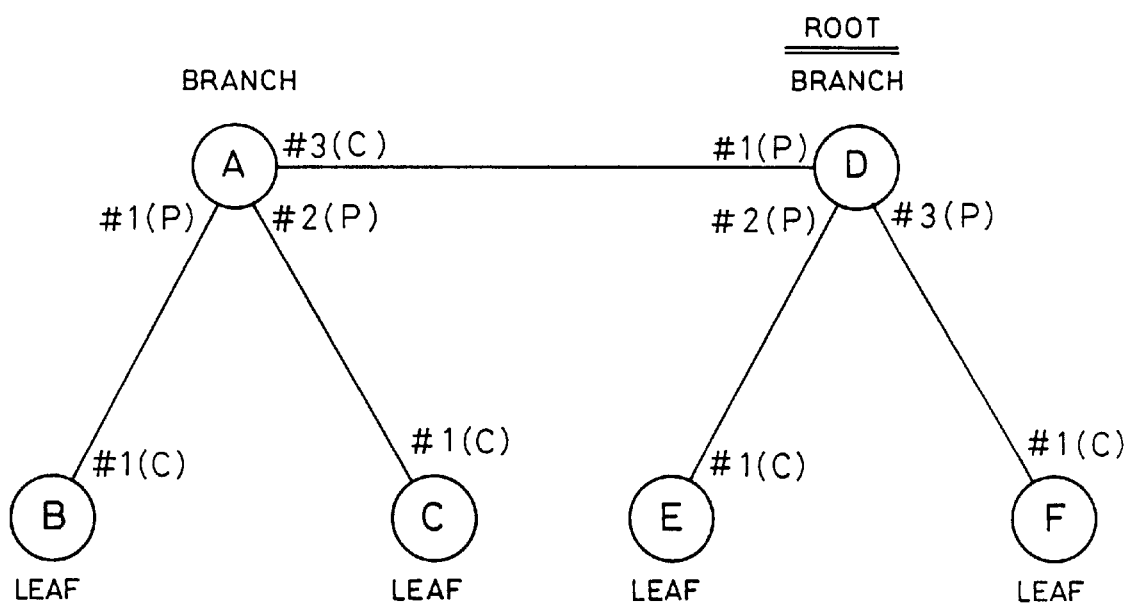
FIG. 6 is an exemplary diagram showing a third transition state of the data transmission system in the tree identification process.

FIG. 3 exemplifies a mode for the tree identification process, and FIGS. 4 through 6 represent an explanation of the transition states in the tree identification process.

Suppose that a node A is a branch node, nodes B and C are leaf nodes connected to the node A, which is further connected to another branch node D, as shown in FIG. 4. A "branch node" is a node which is connected to two or more nodes, and a "leaf node" is an end node which is connected only to a single node. Nodes that constitute the system are either a branch node or a leaf node.

Each of the nodes A and D has port numbers #1, #2 and #3 given to the three ports for bus connection as shown in FIG. 4, and can detect their bus connection states. Each node A or D recognizes that it is a branch node as those ports are used for bus connection to other nodes.

Each of the nodes B, C, E and F has a port number #1 given to a single port for bus connection as shown in FIG. 4, and can detect its bus connection state. As this port alone is used for bus connection to another node, those nodes recognize that they are leaf nodes.

When, in the above-mentioned connection configuration, the tree identification process is activated, the nodes B and C which have recognized themselves as leaf nodes respectively send notification signals "parent_notify(1)" and "parent_notify(2)" indicating notification from a child node to a parent node to the branch node A, as shown in FIG. 3.

The branch node A, which has received, first, the notification signal "parent_notify(1)" from the leaf node B of those two notification signals, sends a notification signal "child_notify(1)" indicating notification from a parent node to a child node to the leaf node B first. This determines the parent-child relationship between the leaf node B and the branch node A.

The leaf node C keeps sending a notification signal "parent_notify(2)" until it receives a notification signal "child_notify" from the branch node A. Upon reception of the notification signal "parent_notify(2)" from the leaf node B, the branch node A sends a notification signal "child_notify(2)" indicating notification from a parent node to a child node to the leaf node C. This determines the parent-child relationship between the leaf node C and the branch node A.

Though not illustrated in FIG. 3, the parent-child relationships between the branch node D and the leaf nodes which are connected to the node D are likewise determined.

Therefore, the parent-child relationships as shown in FIG. 5 are to be identified at the respective nodes. In FIG. 5, (P) affixed to each port number indicates that the port is a parent to those nodes which are connected to this port, and (C) affixed to each port number indicates that the port is a child to the node which is connected to this port.

Every leaf node and every branch node checks the parent-child relationship by exchanging the aforementioned notification signals "parent_notify" and "child_notify". However, the branch nodes have not exchanged any notification signal with each other yet when confirmation of the parent-child relationship between the leaf and branch nodes is completed, and thus recognize that no parent-child relationship has been determined between them. As a result, the branch nodes send a notification signal "parent notify(3)" to each other.

When the two branch nodes which have sent the notification signal to each other receive the notification signal "parent_notify(3)", they set independent times in timers and then start the timers. One of the branch nodes whose set time has elapsed earlier, e.g., the branch node A, sends a notification signal "parent_notify(4)" to the other branch node D. As the branch node D receives the notification signal "parent_notify(4)" before its set time passes, it recognizes itself as a parent node of the node A and sends a notification signal "child_notify(4)" to the node A.

The parent-child relationship between the branch nodes is determined this way as shown in FIG. 6. The parent-child relationship between other branch nodes is likewise recognized, and the parent node in two branch nodes whose parent-child relationship has been determined last becomes a root node. For the connection configuration as shown in FIGS. 4 to 6, the root node is the node D.

In this embodiment, loop detection is carried out in such a process of determining the root node.

This will be discussed more specifically on the assumption that the nodes B and C are connected as indicated by the broken line in FIG. 4, thereby causing the nodes A, B and C to form a loop.

In this case, since not only the node A but also the nodes B and C recognize themselves as branch nodes, they do not send the notification signals "parent_notify" after activation of the tree identification process and stand by to receive such a notification signal. Consequently, the nodes A, B and C will hang up.

The condition for generation of the notification signal "parent_notify" from a branch node is that the parent-child relationship is not settled only for one port. As the parent-child relationship has not been settled for two ports of each of the branch nodes A, B and C, however, no notification signal "parent_notify" is generated. Without an exchange of the notification signal "parent_notify", the parent-child relationship and the root node are not determined, so that the data transmission system cannot go to the ordinary data transmission mode.

To avoid such a situation, according to this embodiment, each node measures the duration of time in which the state of no notification signal "parent_notify" being transmitted or received continues, detects the existence of a loop when determining that such a state continues for a predetermined time, and then generates a detection signal indicating that event. In response to the detection signal generated, the system proceeds to a bus failure recovery process (see FIG. 2). To accomplish this series of steps, specifically, each node performs a forbidden connection detecting process of measuring an elapsed time since activation of the tree identification process and detecting the existence of a loop when the measured time exceeds a predetermined time.

The self-identification process in step S3 will now be discussed in detail.

Figure 7:
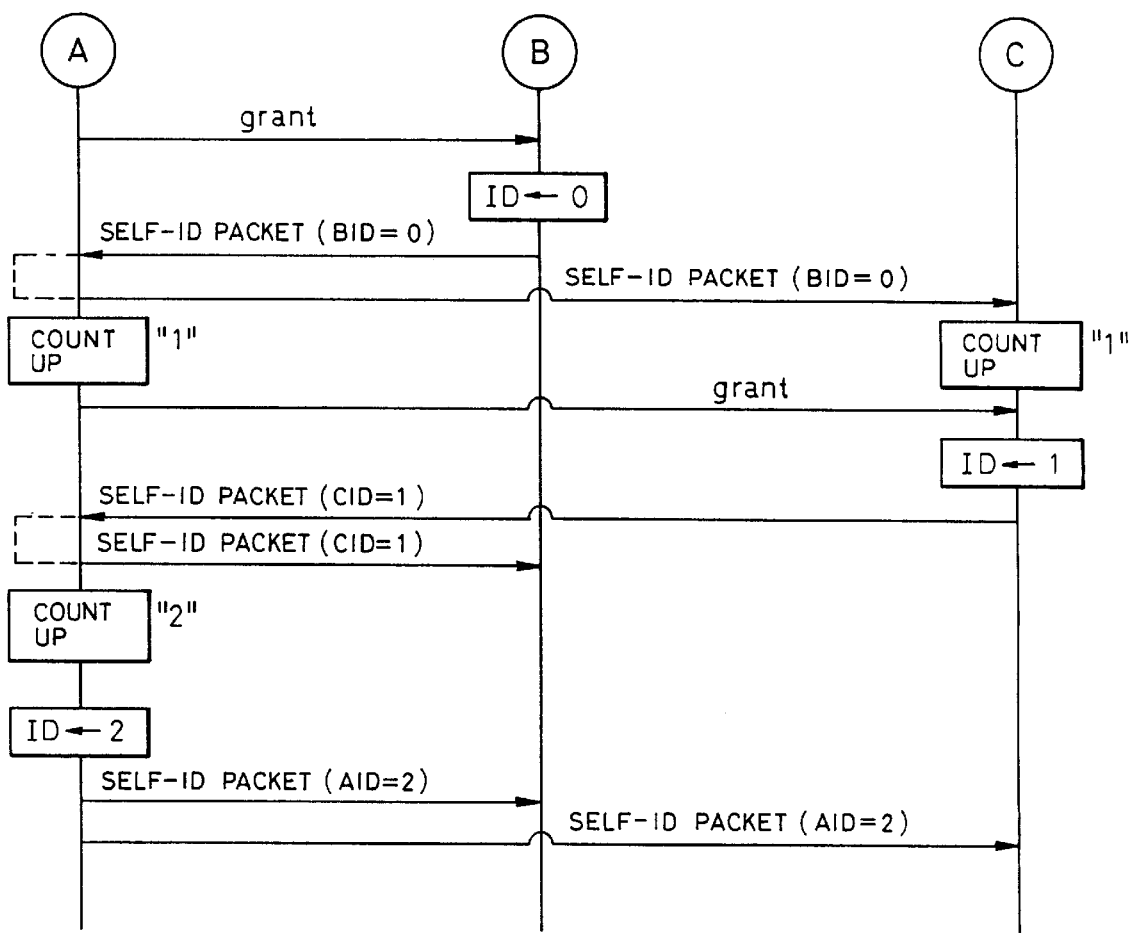
FIG. 7 is a time chart illustrating an example of a self-identification process.
Figure 8:
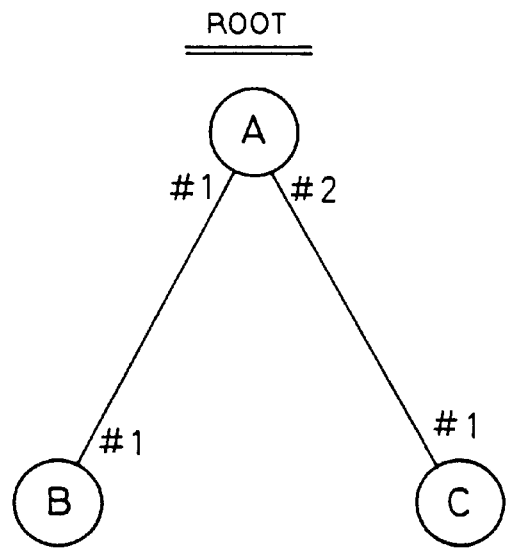
FIG. 8 is an exemplary diagram depicting a first transition state of the data transmission system in the self-identification process.
Figure 9:
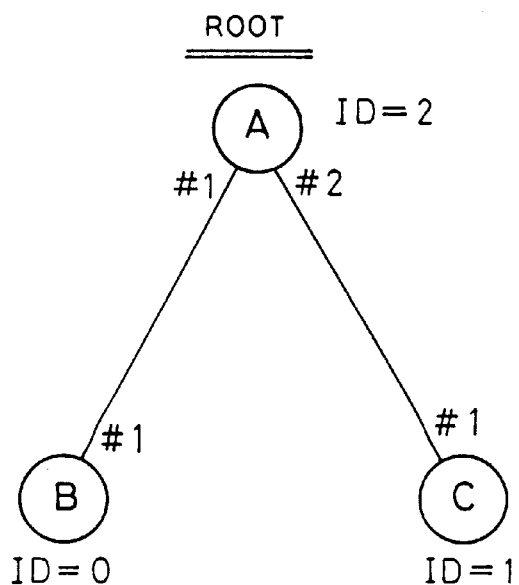
FIG. 9 is an exemplary diagram depicting a second transition state of the data transmission system in the self-identification process.

FIG. 7 illustrates an example of the self-identification process, and FIGS. 8 and 9 represent an explanation of the transition states in the self-identification process.

The self-identification process first sends a signal "grant", which permits the root node A to affix ID data after completion of the tree identification process as shown in FIG. 8, to the node B which is connected to the port with the smallest port number. Upon reception of the signal "grant", the node B sets the content of an internal memory for ID storage and identifies its own ID number as such, and sends a self-ID packet to the node A (BID=0). The self-ID packet the node A has received from the node B is also sent to the node C via the node A.

The nodes A and C increment the values of their internal counters by "1" to "1" upon reception of the self-ID packets (BID=0).

Thereafter, the node A sends the signal "grant" to the node C which is connected to the port with the second smallest port number. Upon reception of the signal "grant", the node C shifts the count value of the internal counter to an internal memory for ID storage to set the content of the internal memory to "1" and identifies its own ID number as such. Then, the node C sends a self-ID packet to the node A (CID=1). The self-ID packet the node A has received from the node C is also sent to the node B via the node A.

The node A increments the value of its internal counter by "1" upon reception of the self-ID packet from the node C.

Consequently, the value of the internal counter of the node A becomes "2". The nodes B and C to which ID numbers have been given need not operate their internal counters thereafter upon reception of self-ID packets.

When affixing of ID numbers to both child nodes B and C is completed, the parent node A reads out the value of the internal counter, sets the content of the internal memory for ID storage to "2", identifies its own ID number as such, and then sends a self-ID packet to the nodes B and C (AID=2). In this manner, assigning ID numbers to the individual nodes as shown in FIG. 9 and mutual identification of the nodes is performed.

In this embodiment, detection of excess nodes is implemented in the above process of determining the root node.

This detection will now be described more specifically. The detection of excess nodes is performed by checking if the content of the ID affixed completion signal in the form of a self-packet has reached the ID number "62" (which is equivalent to 63 as the ID number starts with "0"), or by checking if the value of the internal counter of the node is greater than "62". In this example, when each node performs the forbidden connection detecting process and the internal counter of a certain node counts up to "62", this node determines that the number of nodes is greater than the number of nodes specified in the standards for this system. Then, this node generates a signal indicating the event, and goes to the bus failure recovery process which will be described later.

In the determination process of the IRM/bus manager in step S4 in FIG. 2, the node that serves as the bus manager is decided, and analyzes a topology map which is acquired by gathering ID data, affixed in the selfidentification process.

The "topology map" is obtained on the basis of the ID data and tree identification information, and is a network connection information of nodes associated with ID information of the nodes. The bus manager node analyzes the topology map to detect if connection paths on the bus contain any connection path in which the number of nodes connected thereto exceeds a specific number, including one terminal node and the other terminal node. That is, excess hop count detection for checking if the hop count in the network connection is greater than the connectable maximum hop count of "16" is executed as the forbidden connection detecting process.

This excess hop count detection can be implemented by not only the bus manager node but also each of the other nodes.

When an excess hop count is detected, the bus manager node generates a signal indicating the event and goes to the next bus failure recovery process.

The bus failure recovery process may take various modes.

The bus failure recovery process is carried out as a process of handling a bus failure situation after loop detection, excess nodes detection or excess hop count detection is made as a bus failure.

The first mode of the bus failure recovery process notifies the occurrence of a bus failure to a user at some node. For example, a light-emitting type display device like an LED may be used to indicate the normal state, the non-connection state and occurrence of a bus failure by different emission colors. Because there are three types of failures, namely loop connection, excess nodes and excess hop count, as apparent from the foregoing description, it is preferable to individually notify each of those states to a user.

Alternatively, corresponding messages may be displayed on a display device like a liquid crystal display (LCD). The notification is not limited to visual forms, but corresponding alarm sounds or voice messages may be generated instead. Further, the visual notification means and the audio notification means may be combined to notify a bus failure to a user.

Such notification requests a user to alter the network connection for nodes to the proper connection. When the user changes the connection topology, new bus resetting is made and setup for data transmission in the new connection topology is implemented again in the aforementioned steps S2 to S4.

The second mode of the bus failure recovery process forcibly disconnects any improper node from the bus. That is, in a case of loop detection, for example, a connection topology alteration process is performed to invalidate a currently connected cable of at least one of the nodes which form a loop so that the node is electrically disconnected from the bus. This leads to new bus resetting, setup for data transmission in the proper connection excluding the node disconnected from the bus. The new setup is implemented in steps S2 to S4.

In a case of detecting excess nodes, the node that has determined the occurrence of excess nodes may itself be forcibly disconnected from the bus. In a case of excess hop count detection, the node that has determined the event of excess nodes may also be forcibly disconnected from the bus. It is to be noted, however, that the node to be disconnected from the bus need not be restricted to a particular node but may properly be selected from those nodes which can avoid the excess nodes and excess hop count.

In a case of excess nodes detection, as the bus failure recovery process, the node that has determined the occurrence of excess nodes may send a bus disconnection request to a leaf node (e.g., a terminal node) in the bus path which passes through that node, thereby disconnecting the request-received leaf node from the bus.

In a case of excess hop count detection, the following handling operations may be performed as the bus failure recovery process.

One operation is for a case where the bus manager node alone executes excess hop count detection. In this case, the bus manager node sends a bus disconnection request to one of the nodes on the bus path which has been determined as having an excess hop count, e.g., a terminal node in this path, thereby disconnecting the terminal node from the bus.

Another operation is for a case where each node executes excess hop count detection. In this case, one of the nodes on the bus path which has been determined as having an excess hop count, e.g., a terminal node in this path, disconnects itself from the bus.

In the ordinary data transmission mode, the bus manager implements various controls, such as isochronous band control, isochronous channel control, power control and control of topology mapping and speed mapping. The details of those controls will not be discussed here.

Although the foregoing description of the embodiment of the present invention has been given for a data transmission system which conforms to the IEEE 1394-1995 standards, the standards for a data transmission system embodying the present invention should not necessarily be limited to the IEEE 1394-1995 standards.

Although various kinds of means or steps have been explained specifically in the foregoing description of the embodiment, it should be apparent to those skilled in the art that the present invention may be embodied in many other specific forms without departing from the spirit or scope of the invention.

As apparent from the detailed description mentioned above, the present invention can provide a data transmission system that can guarantee proper operation even when any nodes-to-bus connection, which is not allowed by the aforementioned restrictions, is established.

What is claimed is:

1. A data transmission system for implementing data transmission among a plurality of nodes mutually connected by a cable serving as a bus, said system comprising:

means for performing a first process for initializing a control process on said nodes to said bus in accordance with a change in an electrical connection of said bus, a second process of detecting a connection topology of said nodes, and a third process for identifying each node to be connected to said bus;

forbidden connection detecting means for detecting if there is a loop connection path of said nodes on said bus; and handling means for executing handling in accordance with a result of detection by said forbidden connection detecting means.

2. The data transmission system according to claim 1, wherein said forbidden connection detecting means measures an elapsed time since activation of said second process, and detects that there is a loop connection path of said nodes on said bus when the measured time exceeds a predetermined time.

3. A data transmission system for implementing data transmission among a plurality of nodes mutually connected by a cable serving as a bus, said system comprising:

means for performing a first process for initializing a control process on said nodes to said bus in accordance with a change in an electrical connection of said bus, a second process of detecting a connection topology of said nodes, and a third process for identifying each node to be connected to said bus;

forbidden connection detecting means for detecting if the number of said nodes connected to said bus exceeds a specific number; and handling means for executing handling in accordance with a result of detection by said forbidden connection detecting means.

4. The data transmission system according to claim 3, wherein said forbidden connection detecting means detects that the number of nodes which are identified to be connected to said bus in said third process exceeds said specific number.

5. A data transmission system for implementing data transmission among a plurality of nodes mutually connected by a cable serving as a bus, said system comprising:

means for performing a first process for initializing a control process on said nodes to said bus in accordance with a change in an electrical connection of said bus, a second process of detecting a connection topology of said nodes, and a third process for identifying each node to be connected to said bus;

forbidden connection detecting means for detecting if connection paths on said bus contain any connection path having a number of connected nodes, including one terminal node and another terminal node, in which said number exceeds a specific number; and handling means for executing handling in accordance with a result of detection by said forbidden connection detecting means.

6. The data transmission system according to claim 5, wherein said forbidden connection detecting means detects that connection paths on said bus contain any connection path having a number of connected nodes, including one terminal node and another terminal node, in which said number exceeds a specific number, by analyzing connection topology information of those nodes associated with node identification information acquired after completion of said third process.

7. The data transmission system according to claim 1, wherein said handling means includes notification means for notifying establishment of abnormal bus connection in accordance with a result of detection by said forbidden connection detecting means.

8. The data transmission system according to claim 3, wherein said handling means includes notification means for notifying establishment of abnormal bus connection in accordance with a result of detection by said forbidden connection detecting means.

9. The data transmission system according to claim 5, wherein said handling means includes notification means for notifying establishment of abnormal bus connection in accordance with a result of detection by said forbidden connection detecting means.

10. The data transmission system according to claim 7, wherein said notification means notifies said establishment of abnormal bus connection in a mode corresponding to said result of detection by said forbidden connection detecting means.

11. The data transmission system according to claim 8, wherein said notification means notifies said establishment of abnormal bus connection in a mode corresponding to said result of detection by said forbidden connection detecting means.

12. The data transmission system according to claim 9, wherein said notification means notifies said establishment of abnormal bus connection in a mode corresponding to said result of detection by said forbidden connection detecting means.

13. The data transmission system according to claim 1, wherein said handling means includes connection topology changing means for cutting bus connection of some of said nodes in accordance with a result of detection by said forbidden connection detecting means.

14. The data transmission system according to claim 3, wherein said handling means includes connection topology changing means for cutting bus connection of some of said nodes in accordance with a result of detection by said forbidden connection detecting means.

15. The data transmission system according to claim 5, wherein said handling means includes connection topology changing means for cutting bus connection of some of said nodes in accordance with a result of detection by said forbidden connection detecting means.

16. The data transmission system according to claim 13, wherein said first process is activated after a process by said connection topology changing means is completed.

17. The data transmission system according to claim 14, wherein said first process is activated after a process by said connection topology changing means is completed.

18. The data transmission system according to claim 15, wherein said first process is activated after a process by said connection topology changing means is completed.

19. The data transmission system according to claim 1, wherein said system conforms to the IEEE 1394-1995 standards.

20. The data transmission system according to claim 3, wherein said system conforms to the IEEE 1394-1995 standards.

21. The data transmission system according to claim 5, wherein said system conforms to the IEEE 1394-1995 standards.

* * * * *